(12) United States Patent
Han et al.

(10) Patent No.: US 10,966,452 B2
(45) Date of Patent: Apr. 6, 2021

(54) TOBACCO HUMECTANT, PREPARATION METHOD AND USE THEREOF

(71) Applicant: CHINA TOBACCO YUNNAN INDUSTRIAL CO., LTD, Kunming (CN)

(72) Inventors: Jingmei Han, Kunming (CN); Xudong Zheng, Kunming (CN); Hangxing Li, Kunming (CN); Shanzhai Shang, Kunming (CN); Ru Wang, Kunming (CN); Ping Lei, Kunming (CN); Zhiqiang Li, Kunming (CN); Chengya Wang, Kunming (CN); Zhiyong Sun, Kunming (CN); Jianguo Tang, Kunming (CN); Yongkuan Chen, Kunming (CN)

(73) Assignee: CHINA TOBACCO YUNNAN INDUSTRIAL CO., LTD, Kunming (CN)

(*) Notice: Subject to any disclaimer, the term of this patent is extended or adjusted under 35 U.S.C. 154(b) by 0 days.

(21) Appl. No.: 16/608,200

(22) PCT Filed: May 28, 2019

(86) PCT No.: PCT/CN2019/088838
§ 371 (c)(1),
(2) Date: Oct. 25, 2019

(87) PCT Pub. No.: WO2019/228356
PCT Pub. Date: Dec. 5, 2019

(65) Prior Publication Data
US 2021/0051994 A1 Feb. 25, 2021

(30) Foreign Application Priority Data

Jun. 1, 2018 (CN) .......................... 201810554378.4

(51) Int. Cl.
  *A24B 15/14* (2006.01)
  *A24B 13/00* (2006.01)
  (Continued)

(52) U.S. Cl.
  CPC ................. *A24B 15/30* (2013.01); *C07F 7/00* (2013.01)

(58) Field of Classification Search
  CPC .................................. C07F 7/00; A24B 15/30
  (Continued)

(56) References Cited

FOREIGN PATENT DOCUMENTS

| CN | 105056896 A | 11/2015 |
|---|---|---|
| CN | 107099037 A | 8/2017 |

(Continued)

OTHER PUBLICATIONS

Wang Fu-Xue, et al. Syntheses and Applications of UiO Series of MOFs. Chinese Journal of Inorganic Chemistry. May 2017, vol. 33, No. 5, pp. 713-737.
(Continued)

*Primary Examiner* — Philip C Tucker
(74) *Attorney, Agent, or Firm* — Bayramoglu Law Offices LLC

(57) ABSTRACT

A tobacco humectant, which is a metal-organic framework material with a three-dimensional structure obtained by a self-assembly of $Zr^{4+}$ and terephthalic acid or 2-aminoterephthalic acid. The metal-organic framework material with the three-dimensional structure obtained by the self-assembly of the $Zr^{4+}$ and the terephthalic acid is Uio-66, and the metal-organic framework material with the three-dimensional structure obtained by the self-assembly of the $Zr^{4+}$ and the 2-aminoterephthalic acid is Uio-66-$NH_2$. A preparation method of the tobacco humectant and a use thereof in tobacco is further provided.

4 Claims, 4 Drawing Sheets

(51) Int. Cl.
    *A24B 15/28* (2006.01)
    *A24B 15/18* (2006.01)
    *A24B 3/14* (2006.01)
    *A24B 15/30* (2006.01)
    *C07F 7/00* (2006.01)

(58) Field of Classification Search
    USPC .......................................................... 131/290
    See application file for complete search history.

(56) References Cited

FOREIGN PATENT DOCUMENTS

| | | | |
|---|---|---|---|
| CN | 108084453 A | * | 5/2018 |
| CN | 108084453 A | | 5/2018 |
| CN | 108851200 A | | 11/2018 |
| JP | 2017088542 A | | 5/2017 |
| KR | 20180021938 A | | 3/2018 |

OTHER PUBLICATIONS

Liu Qiang, Preparation and Characterization of Metal—Organic Framework of UiO—66 Materials. Yunnan Chemical Technology. Dec. 2016. vol. 43, No. 6, pp. 1-7.

* cited by examiner

TOBACCO HUMECTANT, PREPARATION METHOD AND USE THEREOF

CROSS REFERENCE TO THE RELATED APPLICATIONS

This application is the national phase entry of International Application No. PCT/CN2019/088838, filed on May 28, 2019, which is based upon and claims priority to Chinese Patent Application No. 201810554378.4, filed on Jun. 1, 2018, the entire contents of which are incorporated herein by reference.

TECHNICAL FIELD

The present disclosure belongs to the field of tobacco additives, and more specifically relates to a tobacco humectant, a preparation method and a use thereof.

BACKGROUND

Tobacco leaf is a loose porous material, and thus, thermodynamically, has a high potential for absorbing water. Since the tobacco leaf is a porous material, the free water and capillary moisture are also lost faster at a higher temperature and lower humidity, thereby making cigarettes dry. In the manufacturing process of cigarette products, a humectant can be added to keep a shredded tobacco moisturized and improve the physical moisture retention property of the shredded tobacco.

At present, polyhydroxy compounds such as propylene glycol, glycerin, diethylene glycol, and sorbitol are commonly used as humectants. However, the effects of these humectants on the sensory quality of cigarettes are restrictive. Therefore, a novel humectant is needed to replace the traditional humectant, reduce the dryness and irritation caused by cigarette smoke and enhance the humidity of the cigarette smoke. While improving the internal quality of cigarettes, the harm to human health can be further reduced and the taste of tobacco can be maintained.

Metal-organic frameworks (MOFs) are materials with a relatively high absorption capacity, however, applications of the MOFs in tobacco have not been reported.

SUMMARY

The objective of the present invention is to provide a tobacco humectant which is a MOF material Uio-66 or a derivative Uio-66-$NH_2$ thereof. Further, the objective of the present invention is to provide a use of the tobacco humectant by adding the Uio-66 or the derivative Uio-66-$NH_2$ thereof into tobacco. The Uio-66 or the derivative Uio-66-$NH_2$ thereof has a structure with a good thermal stability, which can be maintained stable at 500° C., and further has a relatively high acid resistance and a certain alkali resistance, an obvious pore structure and a strong moisture retention capacity, thereby improving the moisture retention property of the tobacco.

In a first aspect of the present invention, a tobacco humectant is provided, which is a metal-organic framework material with a three-dimensional structure obtained by a self-assembly of $Zr^{4+}$ and terephthalic acid or 2-aminoterephthalic acid. The metal-organic framework material with the three-dimensional structure obtained by the self-assembly of $Zr^{4+}$ and terephthalic acid is Uio-66. The metal-organic framework material with the three-dimensional structure obtained by the self-assembly of $Zr^{4+}$ and 2-aminoterephthalic acid is Uio-66-$NH_2$.

Preferably, the Uio-66 has a molecular formula of $Zr_{24}O_{120}C_{192}H_{96}$, a molecular weight of 6512.10, and a space group Fm$\bar{3}$m of a cubic crystal system, wherein a=b=c=20.7004 Å. The Uio-66-$NH_2$ has a molecular formula of $Zr_{24}O_{120}C_{192}H_{144}N_{24}$, a molecular weight of 6560.1, and a space group Fm$\bar{3}$m of a cubic crystal system, wherein a=b=c=20.4832 Å.

In a second aspect of the present invention, a method for preparing a tobacco humectant is provided, including the following steps:

(1) mixing a zirconium salt and an amide and dissolving completely to form a solution, adding an organic diacid to the solution to form a mixed solution, and then performing a reaction at a certain temperature under a pressure hermetically;

(2) cooling a reactant of the step (1) to a room temperature at a certain rate, performing a separation to obtain a solid matter, and washing;

(3) drying the solid matter obtained in the step (2) at a certain temperature;

(4) adding the amide to the solid matter obtained in the step (3) again, mixing uniformly, performing a separation to obtain a solid matter, and washing;

(5) drying the solid matter obtained in the step (4) at a certain temperature;

(6) washing the solid matter obtained in the step (4), and vacuum drying to obtain a solid powder, namely, the tobacco humectant.

Preferably, in the step (1), the zirconium salt is zirconium tetrachloride; and in the step (1) and the step (4), the amide is N,N'-dimethylformamide.

Preferably, in the step (1), the organic diacid is terephthalic acid or 2-aminoterephthalic acid, a reaction temperature is 100-140° C., and a reaction time is 10-40 hours.

Preferably, in the step (2), a cooling rate is 1-10° C./h, a detergent used for the washing is ethanol, and a washing time is 2-4 hours.

Preferably, in the step (3) and the step (5), a drying temperature is 90-110° C., and a drying time is 5-20 hours.

Preferably, in the step (6), the step of washing includes first washing with ethanol and then washing with acetone, and a time for each washing is 1-2 hours.

In a third aspect of the present invention, a use of the above tobacco humectant in tobacco.

Preferably, the tobacco humectant is used in an amount ranging from 0.05% to 1.0% by weight of the tobacco.

Preferably, the tobacco humectant is dissolved in an alcohol mixed solvent, and the tobacco humectant accounts for 2%-5% by weight of the alcohol mixed solvent.

Preferably, the alcohol mixed solvent is a mixture of 1,2-propylene glycol and glycerin at a ratio ranging from 10:1 to 50:1 by weight.

The present invention has the following advantages:

1. In the present invention, a solvothermal preparation method was first used for preparing a MOF material, i.e., a humectant Uio-66 or Uio-66-$NH_2$. The humectant has a three-dimensional structure, a relatively large specific surface area and an obvious pore structure, as shown in FIG. 1 and FIG. 2. The humectant has properties of good thermal stability, low decomposition at high temperature, stable compatibility with the tobacco, no damage to cigarette aroma, no toxicity, no harm, easy accessibility, low cost, and no odor.

2. Through adding the Uio-66 or Uio-66-$NH_2$ prepared by the preparation method of the present invention into tobacco, the progressive additive hazards caused by cigarette additives (such as a humectant, a flavor, etc.) is reduced, safety, moisturizing quality and stability are improved, the anti-mildew function of tobacco is enhanced, the taste of tobacco after burning and smoking is improved, the odor and irritation are eliminated, the cost of cigarettes is reduced, and the economic benefit is increased.

3. The Uio-66 or Uio-66-NH$_2$ prepared by the preparation method of the present invention has a good dynamic moisture sorption property, and can be dissolved and mixed with a flavor and fragrance. Further, the Uio-66 or Uio-66-NH$_2$ can reduce the rate of the change of the moisture content in a shredded tobacco, so that the shredded tobacco can be in a suitable moisture range for a relatively long time. Under the conditions of moistening and constant humidity, the dry sensation in the mouth is reduced, the irritation is decreased, and the aftertaste is improved, making the quality and taste of the cigarettes better. Moreover, benzenes and amines, which are harmful substances in the smoke, are adsorbed as well.

DETAILED DESCRIPTION OF THE EMBODIMENTS

The present invention is further described in detail below with reference to the specific embodiments. It should be noted that the specific embodiments are only the preferred embodiments of the present invention, and are not intended to limit the scope of the present invention, that is, all equivalent changes and modifications made according to the scope of the present application should still be within the protective scope of the present invention.

Embodiment 1

Figure 1:
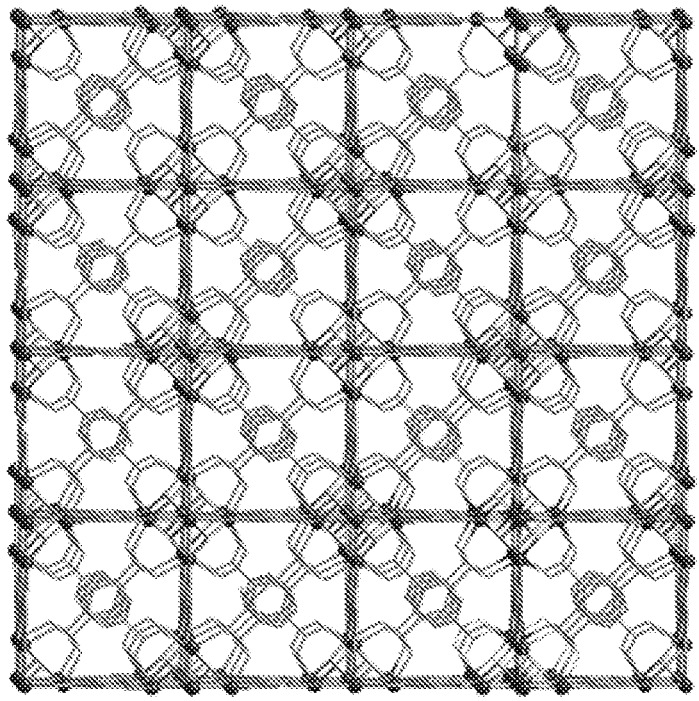
FIG. 1 is a schematic diagram showing a three-dimensional structure of a tobacco humectant Uio-66 of the present invention.

Preparation of Tobacco Humectant Uio-66 by Solvothermal Method:

15 mmol of anhydrous ZrCl$_4$ was placed in a beaker, and 30 mL of N,N'-dimethylformamide was added, followed by a sonication for 30 minutes until complete dissolution. 15 mmol of terephthalic acid and 60 mL of N,N'-dimethylformamide were added to the above solution, and the sonication was continued for 30 minutes until complete dissolution. The above mixed solution was transferred to a polytetrafluoroethylene reactor for a reaction at 120° C. for 24 hours. A first solid product was filtered out, washed with 20 mL of ethanol at 60° C., dried and transferred to a conical flask, 30 mL of N,N'-dimethylformamide was added, and stirring was performed to remove the unreacted ligand. The above product was filtered out, washed with 20 mL of ethanol, dried and transferred to the reactor, followed by drying in an oven at 90° C. for 12 hours. A second solid product was obtained by a centrifugation, then washed and centrifuged twice with 20 mL of ethanol, and washed and centrifuged twice with 20 mL of acetone, and then the solid was dried. The final product was placed in a reaction dish and dried under vacuum for 12 hours to obtain the tobacco humectant Uio-66. The three-dimensional structure of the obtained tobacco humectant Uio-66 is shown in FIG. 1. As can be seen from the FIG. 1, the obtained tobacco humectant Uio-66 has a relatively large specific surface area and an obvious pore structure. The prepared Uio-66 was determined to have a molecular formula of $Zr_{24}O_{120}C_{192}H_{96}$, a molecular weight of 6512.10, a space group of $Fm\overline{3}m$ of a cubic system, wherein a=b=c=20.7004 Å.

Embodiment 2

Figure 2:
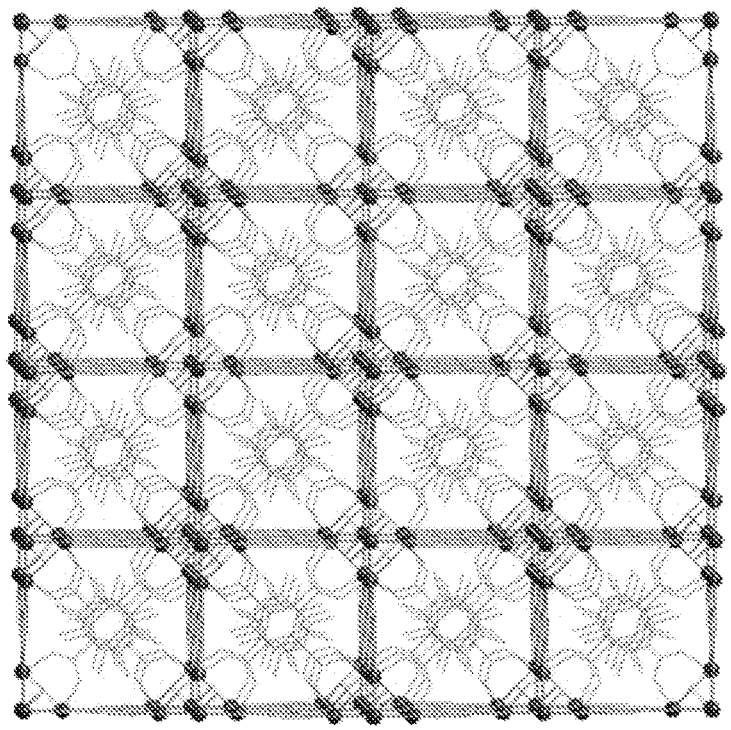
FIG. 2 is a schematic diagram showing a three-dimensional structure of a tobacco humectant Uio-66-NH$_2$ of the present invention.

Preparation of Tobacco Humectant Uio-66-NH$_2$ by Solvothermal Method 18 mmol of anhydrous ZrCl$_4$ was placed in a beaker, and 30 mL of N,N'-dimethylformamide was added, followed by a sonication for 30 minutes until complete dissolution. 14 mmol of 2-aminoterephthalic acid and 50 mL of N,N'-dimethylformamide were added to the above solution, and the sonication was continued for 30 minutes. The above mixed solution was transferred to a polytetrafluoroethylene reactor for a reaction at 120° C. for 24 hours. A first solid product was filtered out, washed with 20 mL of ethanol at 60° C., dried and transferred to a conical flask, 30 mL of N,N'-dimethylformamide was added, and stirring was performed to remove the unreacted ligand. The above product was filtered out, washed with 20 mL of ethanol, dried and transferred to a reactor, followed by drying in an oven at 90° C. for 12 hours. A second solid product was obtained by a centrifugation, then washed and centrifuged twice with 20 mL of ethanol, and washed and centrifuged twice with 20 mL of acetone, and then the solid was dried. The final product was placed in a reaction dish and dried under vacuum for 12 hours to obtain the tobacco humectant Uio-66-NH$_2$. The three-dimensional structure of the obtained tobacco humectant Uio-66-NH$_2$ is shown in FIG. 2. As can be seen from the FIG. 2, the obtained tobacco humectant Uio-66-NH$_2$ has a relatively large specific surface area and an obvious pore structure. The prepared Uio-66-NH$_2$ was determined to have a molecular formula of $Zr_{24}O_{120}C_{192}H_{144}N_{24}$, a molecular weight of 6560.1, and a space group of $Fm\overline{3}m$ of a cubic system, wherein a=b=c=20.4832 Å.

Figure 3:
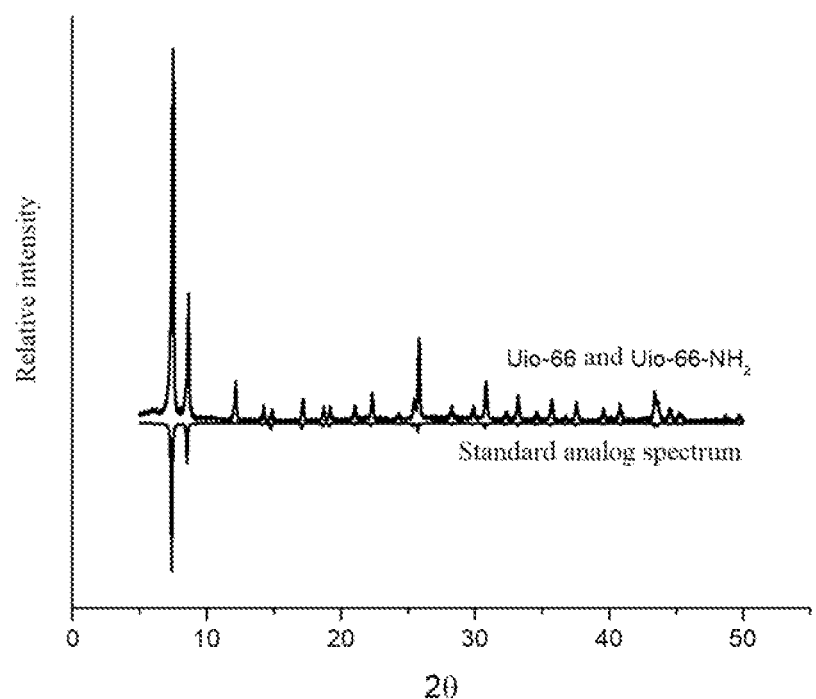
FIG. 3 is a diagram showing a powder X-ray diffraction (PXRD) of tobacco humectants Uio-66 and Uio-66-NH$_2$ of the present invention.

The powder X-ray diffraction (PXRD) pattern of the obtained tobacco humectants Uio-66 and Uio-66-NH$_2$ is shown in FIG. 3. As can be seen from FIG. 3, the Uio-66 and Uio-66-NH$_2$ obtained are relatively pure.

Embodiment 3

Determination of Dynamic Changes in Moisture Content of Tobacco Added with Tobacco Humectant Uio-66

Figure 4:
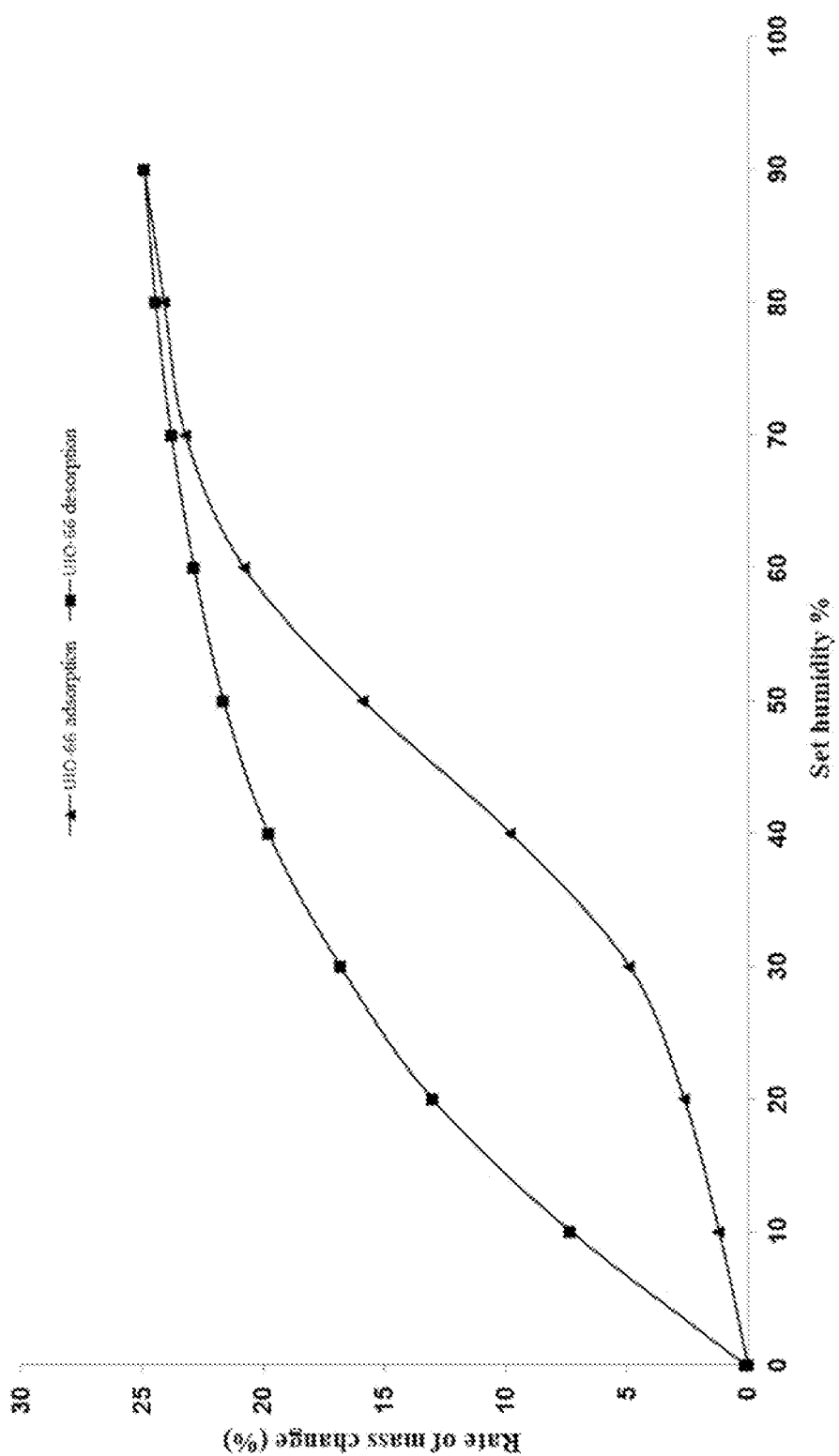
FIG. 4 is a diagram showing a result of a dynamic vapor sorption analysis of a tobacco humectant Uio-66 of the present invention.

The tobacco humectant Uio-66 prepared in Embodiment 1 was dissolved in a mixed solvent of 1,2-propylene glycol and glycerin, and added to the shredded tobacco according to 0.2% of the amount of the humectant by weight, and a shredded tobacco sample containing an equal amount of the alcohol mixed solvent without the humectant Uio-66 was used as a blank control. The shredded tobacco samples were then placed in a dynamic vapor sorption (DVS) apparatus at a temperature of 22° C. and a relative humidity of RH46% to determine the moisture dynamic content. The results are shown in Table 1 and FIG. 4. As can be seen from FIG. 4, the adsorption-desorption curve of the Uio-66 has a relatively large sorption hysteresis, and under certain pressure, the Uio-66 has a certain moisture adsorption-retention capability with a maximum adsorption amount of up to 14%, showing a good moisture adsorption capacity.

Embodiment 4

Figure 5:
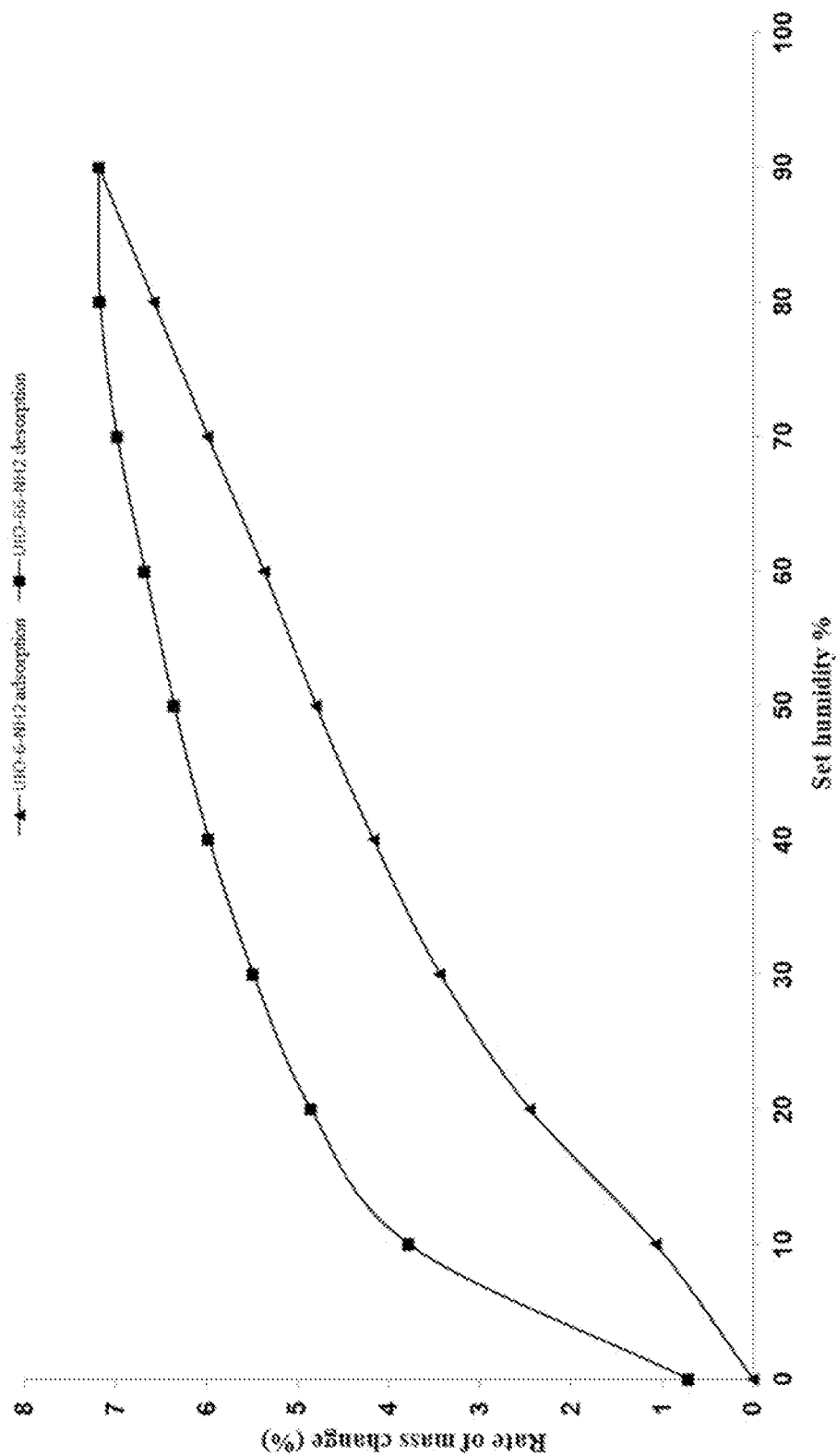
FIG. 5 is a diagram showing a result of a dynamic vapor sorption analysis of a tobacco humectant Uio-66-NH$_2$ of the present invention.

Determination of Dynamic Moisture Content of Tobacco Added with Tobacco Humectant Uio-66-$NH_2$ The Uio-66-$NH_2$ prepared in Embodiment 2 was dissolved in a mixed solvent of 1,2-propylene glycol and glycerin, and added to the shredded tobacco according to 0.2% of the amount of the humectant by weight, and a shredded tobacco sample containing an equal amount of the alcohol mixed solvent was used as a blank control. The shredded tobacco samples were then placed in a dynamic vapor sorption (DVS) apparatus at a temperature of 22° C. and a relative humidity of RH46% to determine the moisture dynamic content. The results are shown in Table 1 and FIG. 5. As can be seen from FIG. 5, the adsorption-desorption curve of the Uio-66-$NH_2$ has a good sorption hysteresis, and under certain pressure, the Uio-66-$NH_2$ has a certain moisture adsorption-retention capability with a maximum adsorption amount of up to 3.5%, showing a good moisture adsorption capacity.

Table 1 shows a comparison of the moisture adsorption/desorption changes among the tobacco humectant Uio-66 and, the tobacco humectant Uio-66-$NH_2$ and the equivalent alcohol mixed solvent in tobaccos.

TABLE 1

Comparison of moisture adsorption/desorption changes among Uio-66, Uio-66-$NH_2$ and propylene glycol

| | Sorption hysteresis degree | | |
|---|---|---|---|
| % $P/P_0$ | Uio-66 | Uio-66-$NH_2$ | Equivalent alcohol mixed solvent |
| 10.0 | 6.12 | 2.714 | 0.956 |
| 20.0 | 10.40 | 2.403 | 1.052 |
| 30.0 | 11.93 | 2.051 | 1.099 |
| 40.0 | 9.99 | 1.805 | 1.117 |
| 50.0 | 5.75 | 1.556 | 1.174 |
| 60.0 | 2.06 | 1.303 | 1.352 |

The adsorption hysteresis degree in Table 1 indicates a moisture adsorption-retention capability at a certain pressure. As can be seen from Table 1, the adsorption hysteresis degrees of the Uio-66 and the Uio-66-$NH_2$ are significantly larger than that of the equivalent alcohol mixed solvent, indicating that the Uio-66 and the Uio-66-$NH_2$ have a strong moisture retention capability. Meanwhile, under each set humidity, the values of the adsorption hysteresis degrees of the Uio-66 and the Uio-66-$NH_2$ are greater than that of the equivalent alcohol mixed solvent, indicating that the moisture content retention and moisturizing capabilities of the Uio-66 and the Uio-66-$NH_2$ are better than that of the control group of the equivalent alcohol mixed solvent. Adding the Uio-66 or the Uio-66-$NH_2$ to the tobacco helps to maintain the moisture content of the cigarettes, and increases the humidity and comfort level of the cigarette smoke, which brings a great practical significance in tobacco moisturizing.

Embodiment 5

Sensory Evaluation of Cigarette after Adding Tobacco Humectant Uio-66

The tobacco humectant Uio-66 was uniformly mixed in the shredded tobacco at 1% of the dry weight of the shredded tobacco. The control sample was the same quality of shredded tobacco without the Uio-66. The tobacco samples were placed in a constant temperature and humidity chamber with a humidity of 60±3% and a temperature of 22±1° C. for 48 hours. After manual rolling, the sensory evaluation was performed by organized professional assessment staffs according to GB5606.4-2005. The sensory evaluation results showed that the cigarette containing the humectant Uio-66 had a better taste, a stronger sweetness, a better flavor, and a better smoking comfort.

Embodiment 6

Sensory Evaluation of Cigarette after Adding Tobacco Humectant Uio-66-$NH_2$

The tobacco humectant Uio-66-$NH_2$ was uniformly mixed in the shredded tobacco at 1% of the dry weight of the shredded tobacco. The control sample was the same quality of shredded tobacco without the Uio-66-$NH_2$. The tobacco samples were placed in a constant temperature and humidity chamber with a humidity of 60±3% and a temperature of 22±1° C. for 48 hours. After manual rolling, the sensory evaluation was performed by organized professional assessment staffs according to GB5606.4-2005. The results showed that the cigarette containing the humectant Uio-66-$NH_2$ had a better taste, a enhanced sweetness, a less irritation, and a better smoking comfort.

Conclusion

The results of the sensory evaluation in Embodiments 5 and 6 indicate that the tobacco humectants Uio-66 and Uio-66-$NH_2$ obtained by the present invention can be added to tobacco, which can maintain the humidity of the tobacco, can bring the cigarette a sweet and moist sensory, and improve the comfort level of the cigarette smoke, and can be used as an additive material as a component in a formula of rolled tobacco leaves.

The foregoing description is merely the basic description under the conception of the present invention. Any equivalent transformation made according to the technical solution of the present invention shall fall within the protective scope of the present invention.

What is claimed is:

1. A method of preparing tobacco, comprising the step of using a tobacco humectant as an additive material in the tobacco, wherein, the tobacco humectant is a metal-organic framework material with a three-dimensional structure obtained by a self-assembly of $Zr^{4+}$ and terephthalic acid or 2-aminoterephthalic acid; the metal-organic framework material with the three-dimensional structure obtained by the self-assembly of the $Zr^{4+}$ and the terephthalic acid is Uio-66, and the metal-organic framework material with the three-dimensional structure obtained by the self-assembly of the $Zr^{4+}$ and the 2-aminoterephthalic acid is Uio-66-$NH_2$.

2. The method according to claim 1, wherein, the tobacco humectant is used in an amount ranging from 0.05% to 1.0% by weight of the tobacco.

3. The method according to claim 1, wherein, the Uio-66 has a molecular formula of $Zr_{24}O_{120}C_{192}H_{96}$, a molecular weight of 6512.10, a space group of $Fm\bar{3}m$ of a cubic system, wherein a=b=c=20.7004 Å; and the Uio-66-NH$_2$ has a molecular formula of $Zr_{24}O_{120}C_{192}H_{144}N_{24}$, a molecular weight of 6560.1, a space group of Fm$\overline{3}$m of a cubic system, wherein a=b=c=20.4832 Å.

4. The method according to claim 2, wherein, the Uio-66 has a molecular formula of $Zr_{24}O_{120}C_{192}H_{96}$, a molecular weight of 6512.10, a space group of Fm$\overline{3}$m of a cubic system, wherein a=b=c=20.7004 Å; and the Uio-66-NH$_2$ has a molecular formula of $Zr_{24}O_{120}C_{192}H_{144}N_{24}$, a molecular weight of 6560.1, a space group of Fm$\overline{3}$m of a cubic system, wherein a=b=c=20.4832 Å.

* * * * *